United States Patent [19]

Corkery

[11] Patent Number: 4,459,622
[45] Date of Patent: Jul. 10, 1984

[54] DYNAMIC MOTION PROGRAMMABLE SEQUENCER

[75] Inventor: Joseph L. Corkery, San Carlos, Calif.

[73] Assignee: Sony Corporation, Tokyo, Japan

[21] Appl. No.: 364,436

[22] Filed: Apr. 1, 1982

[51] Int. Cl.³ .................. G11B 19/26; G11B 27/02; H04N 5/782
[52] U.S. Cl. ................................ 360/10.3; 360/14.1; 360/73
[58] Field of Search ............... 360/10.1, 10.2, 10.3, 360/14.1, 14.2, 14.3, 71, 73; 358/311, 312; 369/30, 32, 33

[56] References Cited

U.S. PATENT DOCUMENTS

| | | | |
|---|---|---|---|
| 4,040,098 | 8/1977 | Beeson et al. | 360/14.1 |
| 4,210,939 | 7/1980 | Ninomiya et al. | 360/14.3 |
| 4,258,385 | 3/1981 | Greenberg et al. | 358/311 |
| 4,272,790 | 6/1981 | Bates | 360/14.1 |
| 4,386,379 | 5/1983 | Smith et al. | 360/72.3 |

*Primary Examiner*—Donald E. McElheny, Jr.
*Attorney, Agent, or Firm*—Philip M. Shaw, Jr.

[57] ABSTRACT

A videotape controller which, during a stunt learn mode activated by closing any one of a plurality of tape speed control switches, memorizes the tape speed switch settings at uniform intervals of time and then replays those tape speed control settings during an auto stunt mode. The current capacity of the memory storage during either mode is visually displayed.

11 Claims, 3 Drawing Figures

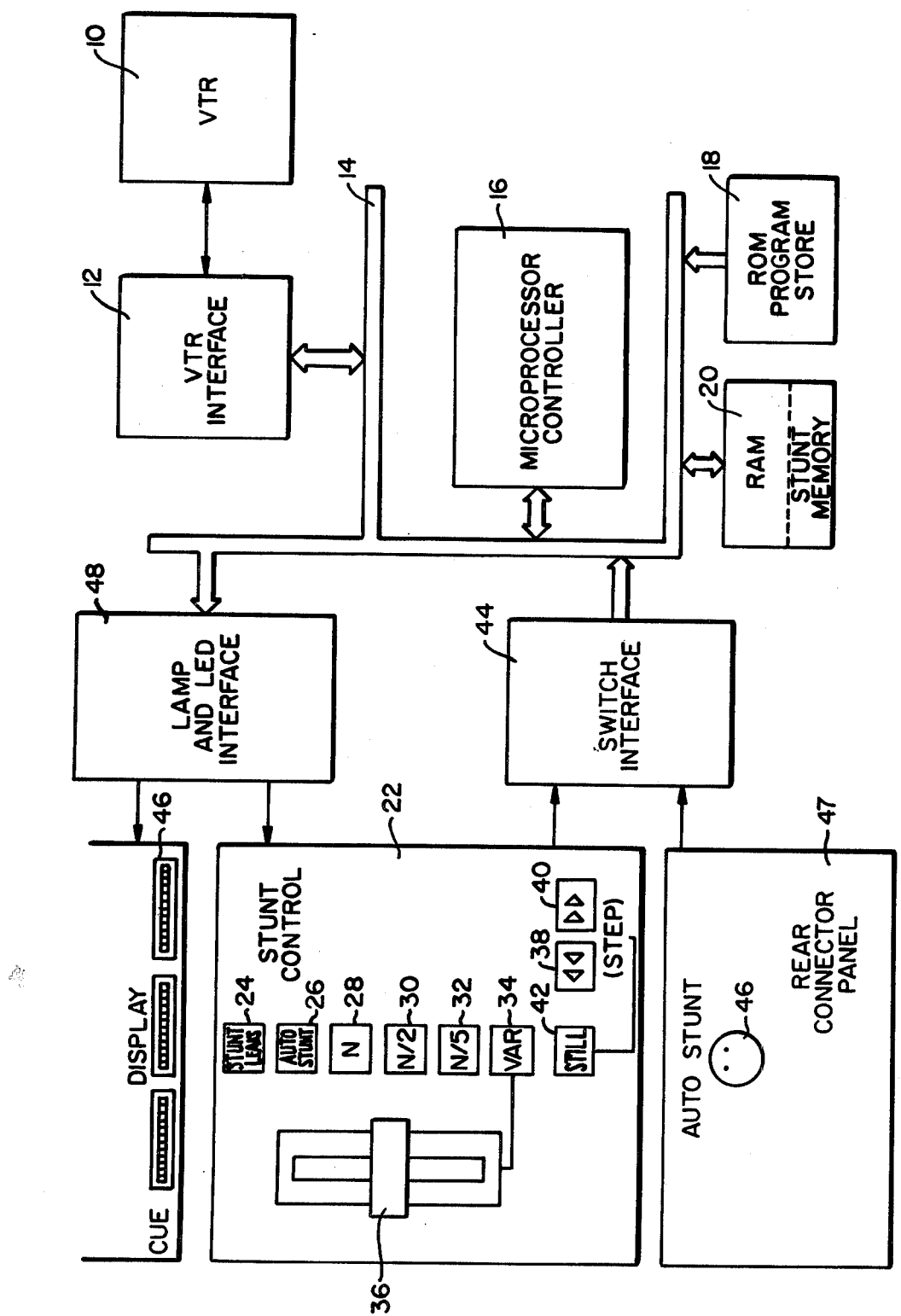
FIG._1.

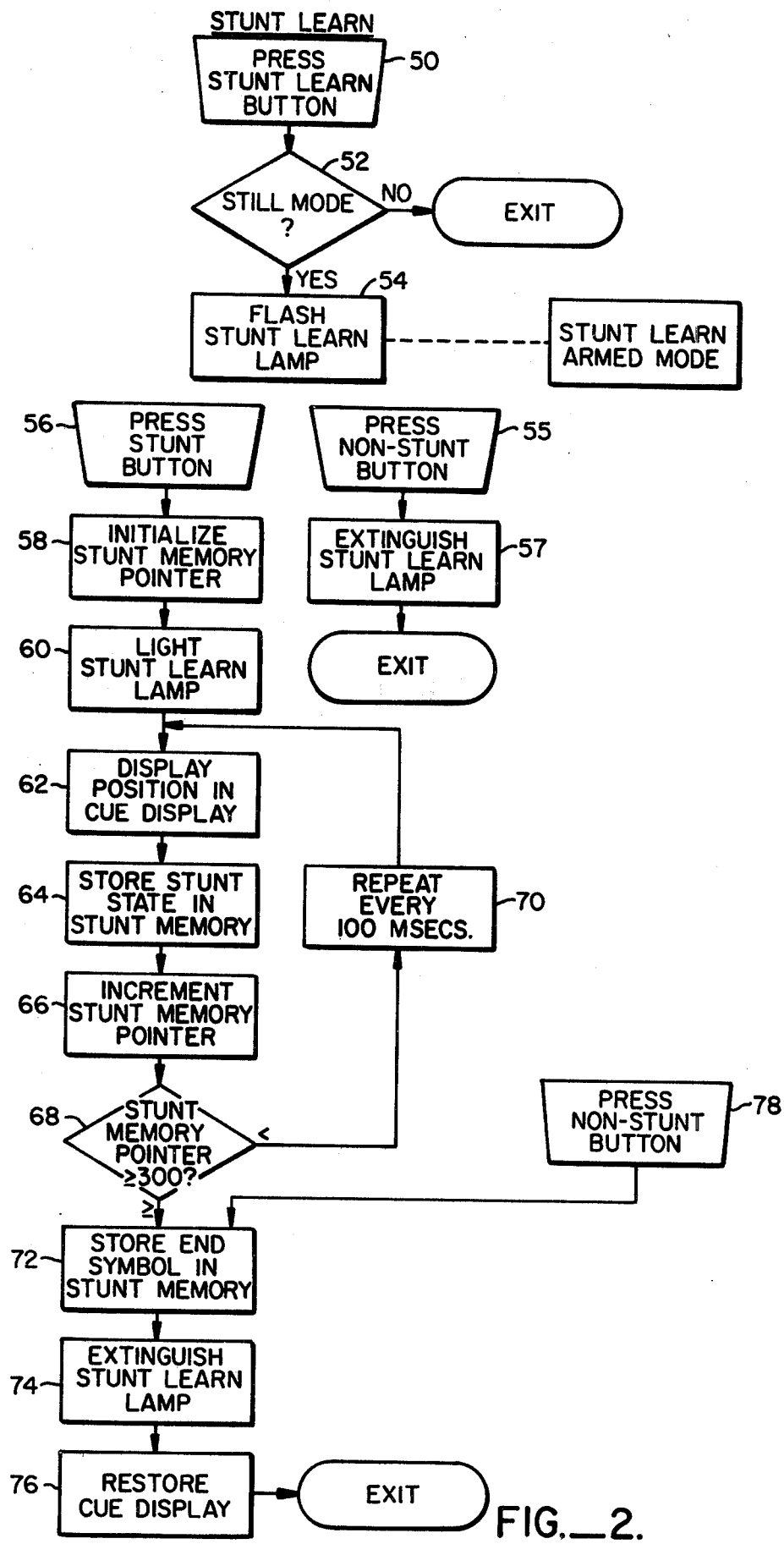
FIG._2.

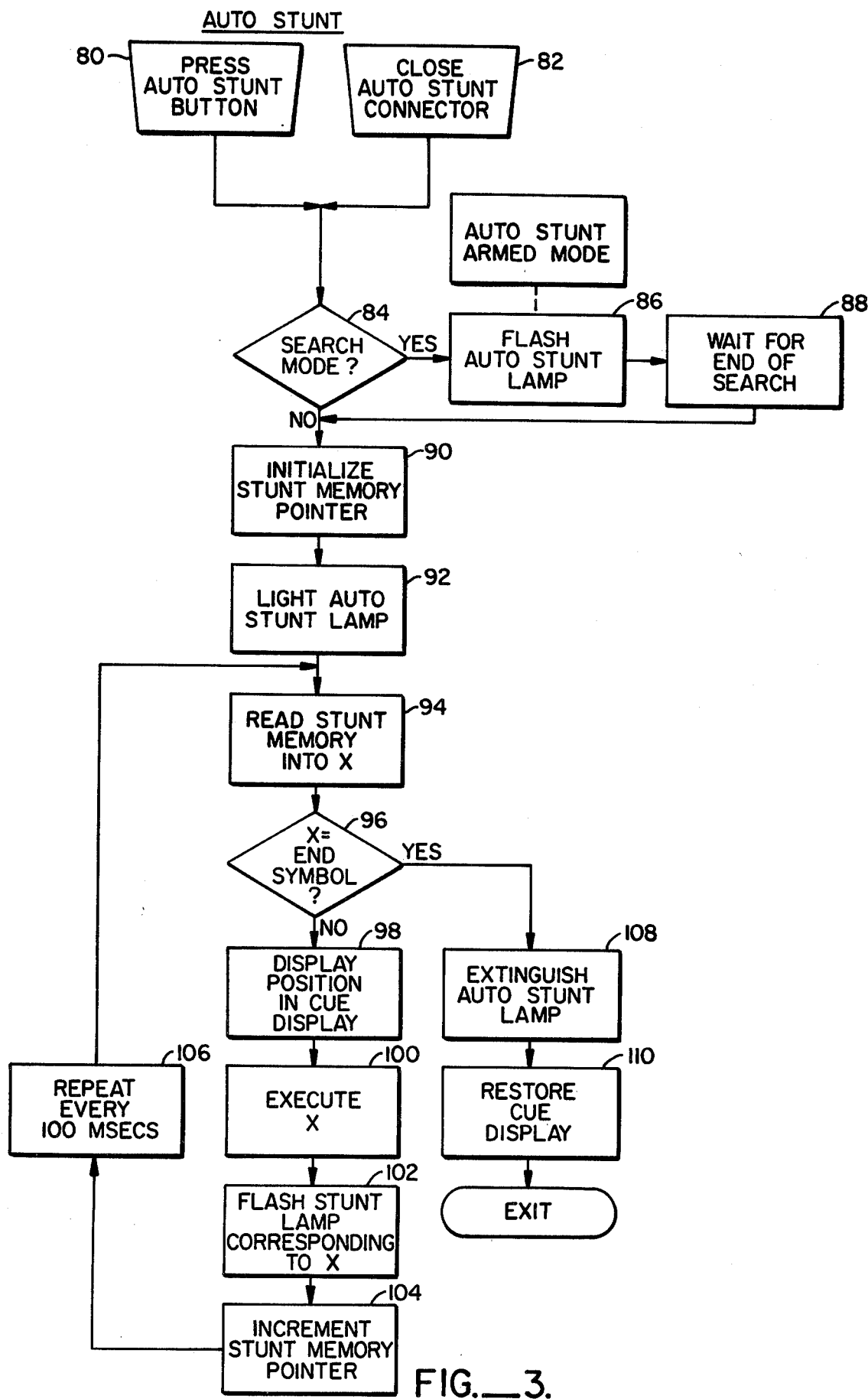
FIG._3.

DYNAMIC MOTION PROGRAMMABLE SEQUENCER

BACKGROUND OF THE INVENTION

This invention relates to a controller for a videotape recorder (VTR) and, more particularly, to a dynamic motion programmable sequencer for use in tape editing and playback.

In the operation of broadcast-type VTRs, it is often desirable to be able to remotely control the VTR and, more particularly, to produce a number of special effects with the recorded program material, such as variable motion effects and post-production editing.

One such editor is described in a copending U.S. patent application Ser. No. 195,824, filed Oct. 10, 1980, now U.S. Pat. No. 4,386,379, and entitled Dynamic Tracking Remote Controller. While the present invention is particularly adapted for use with the editor/controller described in the above identified U.S. patent application, it is not limited to this particular controller and can be used with other types of controllers which are well-known to those skilled in the art. Another such editor/controller is described in U.S. Pat. No. 4,040,098. Since such tape editors are well-known to those skilled in the art, their details will not be discussed herein.

A common feature of all such videotape editors is some means of manually, remotely controlling the videotape speed through one or more switches. These switches may be in the form of a variable control, such as a joystick-potentiometer, or through a series of tape speed switches which allow the tape to be run at normal speed, half normal speed, fifth normal speed, or advanced or reversed one frame at a time, for example.

It is sometimes desirable in tape editing to form what are known as stunts. These involve making a series of variations in tape speed control over a predetermined, continuous sequence of programed a material. Thus, for example, in replaying an end zone catch in a football game, it may be desired to show that portion of the tape material involving the throwing of the pass at half normal speed, the catch of the pass by the player at one fifth normal speed or stilled, and the subsequent action at normal speed. While it is entirely possible to do all of these speed changes manually over a timed period, it is difficult to reperform this sequence of speed changes with any consistency. What is required is a mechanism or circuitry for mechanically or electronically learning a sequence of speed changes made by a skilled operator and then being able to selectively replicate that series of speed changes over and over automatically.

SUMMARY OF THE INVENTION

The ability to learn and reproduce a series of videotape speed changes in order to perform a programed stunt are met by the applicant's invention of an improved control system for a tape recorder, the control system being of the type having a plurality of preselected tape speed control switches for setting the tape speed of the tape recorder. The improved control system of the invention comprises memory means and controller means for selectively sampling the electrical conditions of the tape speed control switches at predetermined, timed intervals and storing the results in the memory means during a first mode which is referred to herein as the stunt learn mode. The control system of the invention thereafter, during a second mode referred to herein as the auto stunt mode, reads out the entire contents of the memory to produce a tape speed control signal corresponding to the switch settings when they were sampled. Both the sampling and the memory readout can be done arbitrarily by the tape control system operator, can be done at any point along the tape and are not in any way required to be keyed to a particular preroll point or in-point.

In the preferred embodiment of the invention, the controller means is initially activated into its first mode, that is the stunt learn mode, by the actuation of any one of the tape speed control switches. The system is armed by the depressing of a stunt learn switch which selectively controls whether or not the controller means operates in the learn mode when any one of the tape speed control switches is actuated. Thus, the stunt learn switch acts essentially as a key to enable operation of the controller in the learn mode. Actuation of an auto stunt switch means selectively enables the controller means to begin operating in its second or auto stunt mode.

The preferred embodiment of the invention also comprises a display having series of energizable elements with each of said display elements representing a different group of predetermined locations in the memory means. The controller means, during the learn mode, energizes each of the display elements as the first memory location in each of the corresponding memory location groups is filled with the sampling results. During the auto stunt mode, the controller means also energizes each of the display elements as the first memory location in each of the corresponding groups is read out. Thus, the operator is, at all times, provided with a visual indication of the amount of memory space remaining during both the learn mode and the auto stunt mode. Additionally, this display is used as a cue location indicator when the controller is not being operated in the learn or auto stunt modes.

It is therefore an object of the present invention to provide a motion controller for a VTR which allows a continuous sequence of tape speed changes to be electronically learned.

It is another object of the invention to provide a motion controller for a VTR which allows the tape speed of the VTR to be automatically controlled by a series of tape speed control signals stored in memory.

It is yet another object of the invention to provide a motion controller for a VTR which allows a series of tape speed changes to be manually selected, stored, and later played back from storage to cause the VTR to duplicate the manually selected tape speed changes.

It is yet another object of the invention to prvide a controller for a VTR which incorporates a stunt learn and an auto stunt mode together with a display for indicating the amount of memory storage available in both the learn and auto stunt modes.

It is yet a further object of the invention to provide a controller for a VTR in which a stunt learn mode is activated by the depressing of any one of the tape speed control switches.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram illustrating the dynamic motion programmable sequencer controller of the invention in conjunction with a VTR;

FIG. 2 is a flow chart depicting the operation of the controller of the invention during the stunt learn mode; and FIG. 3 is a flow chart depicting the operation of the controller of the invention during the auto stunt mode

DETAILED DESCRIPTION OF CERTAIN PREFERRED EMBODIMENTS OF THE INVENTION

Referring now more particularly to FIG. 1, a videotape recorder (VTR) 10 is connected through a VTR interface circuit 12 to a microprocessor bus 14. The bus 14 is, in turn, connected to a microprocessor controller 16. While a number of different commercially available components can be used for these devices, in the preferred embodiment the VTR 10 is a model BVH-1100 made by Sony Corporation. The VTR interface is a model BKD-2901 interface card, also made by Sony Corporation for the BVH-1100. It should be noted that the interface card will depend on the particular VTR which is being utilized. The microprocessor controller, again can be any of a wide variety of microprocessor integrated circuits, however, in the preferred embodiment it is a model Z80 microprocessor controller made by Zilog Corporation.

The microprocessor controller also interfaces, through the microprocessor bus 14, with a read only memory (ROM) 18 and a random access memory (RAM) 20. The ROM 18 is 24,000 by 8 bits in size. The RAM is 2,000 by 8 bits in size. A portion of the RAM 20 is set aside as a stunt memory. The ROM 18 stores the program for operating the microprocessor controller 16. The controller 16 allows the editing functions of the dynamic motion programmable sequencer to be carried out. These functions are described in greater detail in the copending application Ser. No. 195,824, referred to above, and it is only those portions of the program relating to the stunt learn and auto stunt modes which will be described in any detail in this application.

The device of the invention includes a control panel 22 on which are mounted a plurality of tape speed control switches 28 to 42, inclusive. Also mounted on the panel 22 is a stunt learn switch 24 and an auto stunt switch 26. All of these switches 24-42, with the exception of the joystick 36, also include a built-in indicator lamp in the switch button. Closing the switch 28 will cause the VTR to operate the tape at a normal (N) tape speed. Closing the switch 30 will cause the VTR to operate the tape at one half normal (N/2) tape speed. Closing the switch 32 will cause the VTR to operate the tape at one fifth (N/5) of the normal tape speed.

In some situations it is desirable to vary the tape speed smoothly. This is done by pressing the variable speed switch control button 34 and then operating a joystick control 36 through a range of positions which allow the tape motion to be varied from two times normal forward speed, to normal forward speed, to be stilled, that is stopped, and to be reversed at up to one fifth normal speed.

Additionally, if the still switch 42 is depressed, the tape in the VTR 10 will be commanded to stop. If the operator then wishes to advance the tape one frame at a time, the switch button 40 is depressed once for each frame to be advanced. If the operator wishes to move the tape backward one frame at a time, the switch 38 is depressed for each frame of backward movement which is desired The switches of the control panel 22 interface with the controller 16 through a switch interface 44 connected to the microprocessor bus 14. Also connected to the microprocessor bus 14 through the switch interface 44 is an auto stunt connector 46 on the rear connector panel 47. The purpose of the auto stunt connector 46 is to allow remote triggering of the auto stunt mode.

Each of the tape speed control switch lamps is activated by the microprocessor controller 16 through the microprocessor bus 14 and a lamp and light emitting diode interface circuit 48 connected to the microprocessor bus 14. The interface circuit 48 is also connected to a light emitting diode display 46 which contains a series of energizable, light emitting diodes. When the circuitry of the invention is not operating in either the learn mode or the auto stunt mode, the LED display 46 displays cue positions in a manner described in the above identified patent application Ser. No. 195,824. As will be described in greater detail hereinafter, in the present invention the display 46 is utilized to show the extent to which the stunt portion of the memory 20 is filled.

Referring now more particularly to FIG. 2, the operation of the circuitry of the invention during the stunt learn mode will be described. The stunt learn cycle is activated by depressing the stunt learn switch button 24 at step 50. The microprocessor controller 16, through the microprocessor bus 14 and the switch interface card 44, senses whether or not the switch 24 has been depressed and then determines at step 52 whether the VTR tape is moving or not, that is whether it is in the still frame mode. If the tape is moving, then the microprocessor controller 16 exits the stunt learn routine. If the tape is stopped, the microprocessor controller 16 proceeds to step 54 at which it flashes the stunt learn lamp in the switch 24 through the microprocessor bus 14 and the interface circuit 48. This indicates that the system is now in the stunt learn armed mode.

The stunt learn armed mode can be exited by actuating any one of the non-stunt switches such as 24 or 26 at step 55. This will cause the controller 16 to extinguish the stunt learn lamp at step 57 and to exit the routine.

To begin the stunt learn mode, the operator depresses any one of the tape speed control buttons 28 through 42, inclusive at step 56. The microprocessor controller 16 senses when one of these buttons has been depressed, and, in addition, senses the position of the joystick 36 in the event that the button 34 has been depressed. The microprocessor controller proceeds to step 58 at which it initializes the pointer in the stunt memory 20. At step 60, the microprocessor lights the stunt learn lamp built into the stunt learn switch button 24. It will be recalled that prior to this time the stunt learn lamp has been flashing to indicate that the system was in the stunt learn armed mode. The continuous lighting of the lamp indicates that the stunt learn mode is now being carried out.

Each LED in the display 46 is assigned to a predetermined number of locations in the stunt memory 20. As the microprocessor controller samples the condition of each of the tape speed switches 28 through 42, inclusive, it stores this information in the stunt memory 20 at step 64 and simultaneously energizes one of the LEDs in the display 46 corresponding to the first position in the predetermined memory locations corresponding to that particular LED at step 62. The stunt memory pointer is incremented at step 66.

The controller 16 then makes a determination at step 68 whether the memory pointer is at a memory location which is greater than or equal to 300. If it is less than 300, it delays 100 milliseconds and then returns to step 62 and repeats steps 62 through 68. Thus, the memory locations will be filled up over a period of 30 seconds and the corresponding LEDs and the display 46 will be energized as the memory locations are filled with the sampled data. By utilizing a memory of a larger capacity, sampling over a longer period of time could be done. When the controller 16 determines at step 68 that the memory pointer is now at a location greater than or equal to 300, it proceeds to step 72 where it stores an end symbol in the last location in the stunt memory 20. It next extinguishes the stunt learn lamp at step 74, restores the display 46 at step 76 to being a cue display and exits the stunt learn routine.

The stunt learn routine can also be exited by the pressing of a non-stunt button at step 78, such as by again pressing either the stunt learn switch 24 or the auto stunt switch 26. This will cause the microprocessor to proceed directly to step 72.

Referring now more particularly to FIG. 3, the sequence of events which are carried out by the controller 16 in the auto stunt mode are illustrated. The auto stunt sequence is begun at steps 80 or 82 by closing the auto stunt button 26 or by electrically closing the connector 46. Either of these two actions will cause the microprocessor controller 16 to determine whether or not it is in a search mode at step 84. In the search mode the microprocessor controller is looking for a particular cue point on the tape. If the answer to this question is yes, then the microprocessor controller 16 proceeds to step 86 at which it flashes the auto stunt lamp beneath the auto stunt button 26.

This is referred to as the auto stunt armed mode. The microprocessor then waits for the end of the search at step 88. Once it is out of the search mode, it proceeds to step 90 at which point it initializes the pointer in the stunt memory 20. The microprocessor then, at step 92, lights the auto stunt lamp through the interface card 48. It next reads the contents of the stunt memory location, indicated by the pointer, into a temporary address X at step 94. Assuming that the end symbol has not been assigned to X, the microprocessor passes through step 96 and energizes the particular LED in the display 46 corresponding to the particular memory location which has been assigned to the temporary address X. At step 100, the microprocessor executes the instruction at address X, that is, it causes the tape speed to conform to the setting of the tape speed selector switch which was previously stored at that memory location.

At the next step 102, the microprocessor flashes the stunt lamp corresponding to the instruction stored at address X. Thus, if the instruction stored at address X is that the tape speed should proceed at one fifth normal speed, the lamp beneath the switch button 32 will flash to indicate to the operator what speed is being performed. The microprocessor then increments the stunt memory pointer 104 in the memory 20 and delays 100 milliseconds at step 106 before returning to step 94 to repeat the process until the entire contents of the memory have been read out.

Once the microprocessor encounters the end symbol at step 96, it then extinguishes the auto stunt lamp at step 108 and restores the display 46 to the cue display at step 110 and exits the routine.

While the invention has been described above for use with an editor, it could also be built into the VTR.

The terms and expressions which have been employed here are used as terms of description and not of limitation and there is no intention, in the use of such terms and expressions, of excluding equivalents of the features shown and described, or portions thereof, it being recognized that various modifications are possible within the scope of the invention as claimed.

What is claimed is:

1. An improved control system for a tape recorder, the control system being of the type having a plurality of tape speed control switches for setting the tape speed of the videotape recorder, and wherein the improvement comprises
    memory means and
    controller means for selectively sampling the electrical conditions of said switches at predetermined, timed intervals and storing the results in the memory means during a first mode, and thereafter, during a second mode, reading out the entire contents of the memory to produce a tape speed control signal corresponding to the switch settings when they were sampled.

2. A control system for a tape recorder as recited in claim 1 wherein the controller means is initially activated into its first mode by the actuation of any one of the tape speed control switches.

3. A control system for a tape recorder as recited in claim 1 further comprising a display having a series of energizable elements with each of said display elements representing a different group of predetermined locations in said memory means.

4. A control system for a tape recorder as recited in claim 3 wherein said controller means, during the first mode, energizes each of said display elements as the first one of the corresponding memory location in the group corresponding to said display element is filled with the sampling results.

5. A control system for a tape recorder as recited in claims 3 or 4 wherein said controller means, during the second mode, energizes each of said display elements as the first one of each of the memory locations in the corresponding group is read out.

6. A control system for a tape recorder as recited in claim 2 further comprising stunt learn switch means for selectively enabling the controller means to operate in its first mode when any one of the tape speed control switches is actuated.

7. A control system for a tape recorder as recited in claim 2 further comprising auto stunt switch means for selectively causing the controller means to begin operating in its second mode.

8. A control system for a tape recorder as recited in claim 3 wherein the display, when the controller means is not operating in either its first or second modes, displays cue positions.

9. A control system for a tape recorder as recited in claims 2 or 6, further comprising an energizable stunt learn indicator and wherein the controller means, after beginning the first mode, determines whether the tape is then stopped in the VTR, and, if it is, terminates the first mode, and if the tape is not stopped, flashes the stunt learn indicator until one of the tape speed control switches is actuated, at which time the controller causes the stunt learn indicator to be continuously energized.

10. A control system for a tape recorder as recited in claim 1 wherein the controller means, after beginning the second mode, first causes the tape to move until a predetermined cue point is reached, after which the controller means reads out the contents of the memory means.

11. A method of preprogramming a sequence of tape speed changes for a magnetic tape recorder of the type having a plurality of different tape speed control switches comprising the steps of manually activating a series of such tape speed control switches while simultaneously sampling and storing the electrical condition of such switches at uniform intervals of time and thereafter automatically operating the tape recorder at a series of speeds corresponding to the sampled and stored electrical conditions of the tape speed control switches.

* * * * *